May 8, 1962 J. S. BAUMANN ET AL 3,033,392
STOCK STORAGE AND SELECTION SYSTEM
Filed March 21, 1960 6 Sheets-Sheet 5

INVENTORS
J. S. BAUMANN
J. W. MULLER
R. R. TEICHNER
By
ATTORNEY

United States Patent Office 3,033,392
Patented May 8, 1962

3,033,392
STOCK STORAGE AND SELECTION SYSTEM
John S. Baumann, Westfield, N.J., and John W. Muller, Tuckahoe, and Rudolph R. Teichner, Roslyn Estates, N.Y., assignors to Western Electric Company, Incorporated, New York, N.Y., a corporation of New York
Filed Mar. 21, 1960, Ser. No. 16,590
13 Claims. (Cl. 214—16.4)

This invention relates to stock storage and selection systems particularly for distributing houses.

Depending on the particular requirements of the local operating telephone companies for daily shipments of apparatus, cable, wire and other supplies, distributing houses stock from 3,500 to 14,000 items. Most of these items are stored in shelf units which are about 7 ft. high and disposed adjacent to a selecting conveyor. The items cover a wide range of sizes, shapes, and uses from a roll of tape to a telephone set; from a backboard to a tree pruner; from wood screws to station wire. In selection activity, they rang from 100 or more selections per day for some items like tape and flashlight batteries, to one or two selections per month for others such as special codes of telephone sets. A distributing house may fill from 200 to as many as 2,400 orders a day.

One area in each distributing house known as the storage area for "broken package" stocks because the items are primarily dispensed in small quantities, has always presented a challenge in terms of providing facilities sufficiently capacious to store the majority of fast moving items in such a concentrated arrangement that minimum selecting effort need be applied. The necessary conveyors occupy approximately the same floor space as the shelf units and the necessary aisle therebetween. However, it was determined that the actual shelf or storage area could be multiplied greatly if the overhead space could be utilized not only over the substantially 7 ft. shelf unit, in each instance, but over the spaces occupied by the conveyors, providing suitable means could be furnished to conveniently and desirably convey a selector into this area for selection of items disposed therein.

An object of the present invention is a simple efficient, and highly practical stock storage and selection system.

In accordance with the object, the invention comprises a stock storage and selection system for an area having a floor and a work aisle and including an elongated first unit of stock supporting shelves disposed upon the floor at one side of the aisle, a conveyor substantially parallel with the first unit disposed on the other side of the aisle, an overhead support mounted at a fixed position and extending longitudinally of the first shelf unit and laterally over the aisle and conveyor, an elongated second stock supporting shelf unit disposed on the first shelf unit and extending upwardly therefrom, and a third stock supporting shelf unit mounted on the overhead support parallel with the second shelf unit and spaced therefrom.

With this arrangement of shelf units, no additional floor space is required, yet the storage area has been multiplied to greatly increase the capacity of the storage space within a given area. A platform equipped with electrical vertical and horizontal drives and various safety features permits a selector to move to any desired position in the area between the second and third shelf units to select items therefrom and to return to the floor adjacent the conveyor.

Other objects and advantages will be apparent from the following detailed description when considered in conjunction with the accompanying drawings wherein.

Figure 1:
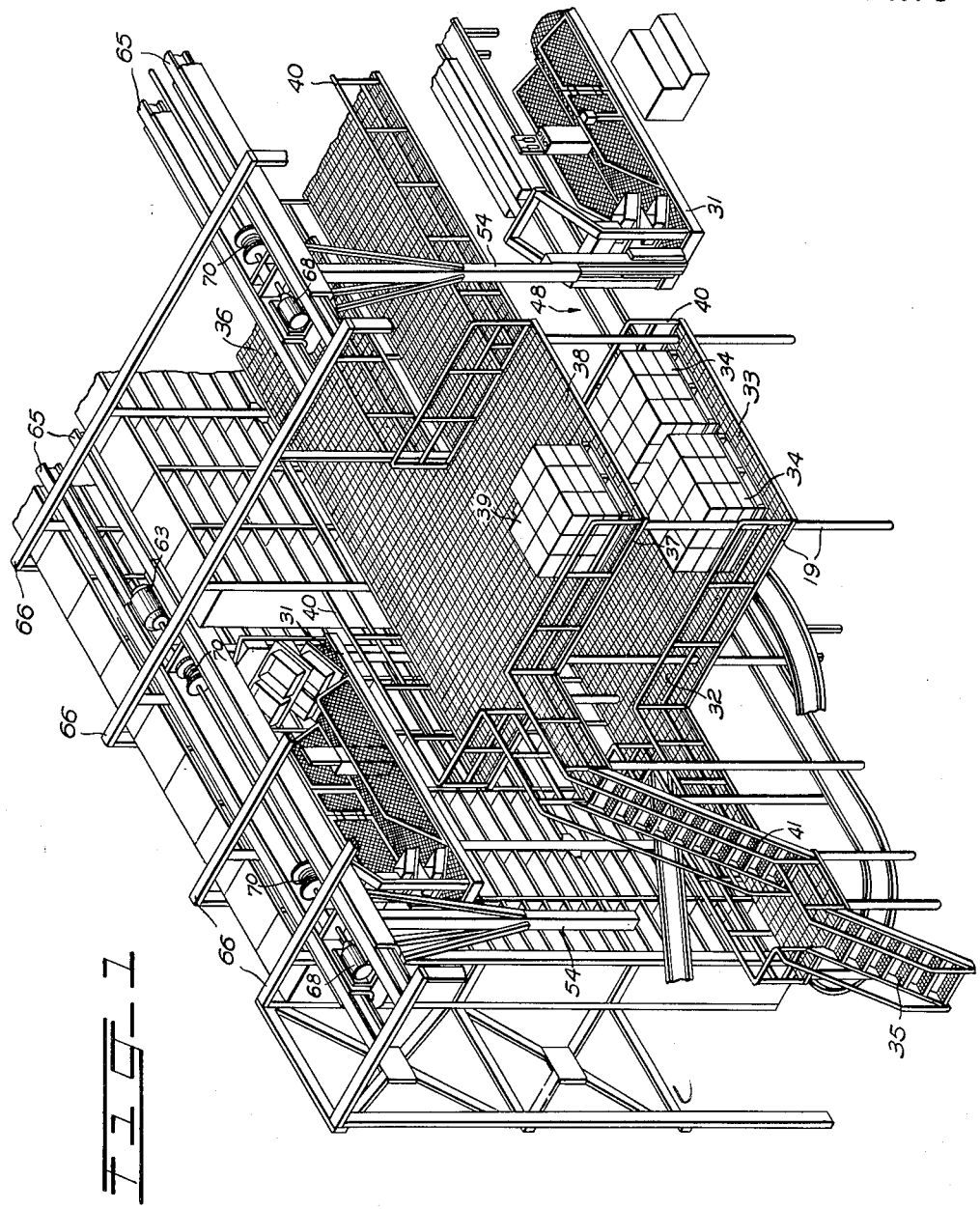
FIG. 1 is an isometric view looking down at one end of the stock storage and selection system.
Figure 2:
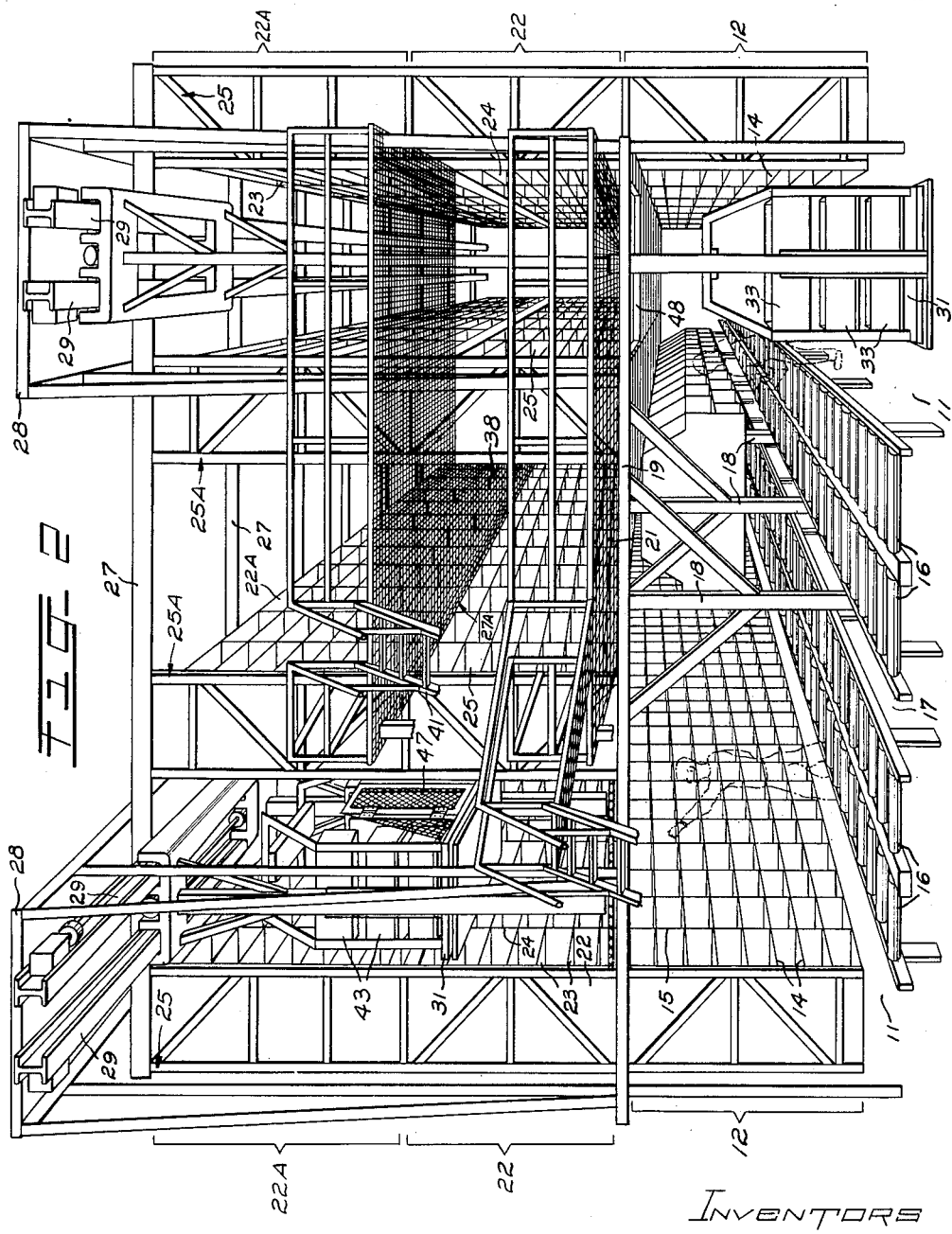
FIG. 2 is an isometric view of the stock storage and selection system looking up just short of the extremity of said one end.

The stock storage and selection system, shown in FIGS. 1 and 2, includes a selected area of a floor 10 including aisles 11 disposed at spaced positions parallel with each other. First tier of shelf units 12 are mounted on the floor 10 adjacent the outer edges of the aisles 11. These shelf units have shelves 14, open front and back, with vertical dividers 15 providing storage areas for numerous items. Pairs of conveyors 16 are disposed adjacent the respective inner edges of their respective aisles 11 leaving a space 17 between the pairs of conveyors for vertical columns 18. An overhead support 19, constructed in any suitable manner such as with channel members, is fixed at its outer edges adjacent to the first shelf units 12 and supported along its center by the vertical columns 18.

Second stock supporting shelf units 22 and 22A, open front and back, are mounted on the first stock supporting shelf units 12, or upon the overhead support 19, and extend vertically therefrom and longitudinally thereof. The second shelf units 22 and 22A have horizontal shelves 23 with vertical dividers 24 similar to those of the first shelf units 12 to provide storage spaces for numerous items.

Third stock supporting shelf units 25, open front and back, are mounted on the overhead support 19 positioned parallel with their respective second shelf units 22 and provided with horizontal shelves and vertical dividers comparable in design and structure to those of the first and second shelf units. The second and third shelf units are tied together by overhead members 27 which serve also to support longitudinal structures 28 which extend beyond the ends of the second and third shelf units for supporting pairs of tracks 29 and other structures for forming a part of the drive means, for a platform 31, for each set of second and third shelf units.

In the present illustration a second floor 32 is mounted on the support 19 at the bottoms of the third shelf units 25. The second floor extends the full length of the third shelf units to full width of the space therebetween and covers a loading area 33 where loads 34 of supplies for the lower third shelf units may be placed by a hoist truck or the like. Steps 35 leading from the main floor 10 to the second floor provide access to the second for a person to fill the lower third shelf units 25 from their back portions.

Another or third floor 36 similar in structure to the second floor and supported by another overhead support 37 similar to and mounted on the overhead support 19 is disposed at the junctures of the lower and upper units 25—25A and has an extension for a loading area 38 to receive loads 39 of supplies for the upper third shelf units 25A. Guard rails 40 are provided for the loading areas 33 and 38. Steps 41 leading from the second floor 32 to the third floor 36 permit loading of the upper third shelf units 25A from the back of each unit.

In the present instance, the two platforms 31 are identical and a description of one will apply to both platforms. Each platform is sufficiently large to accommodate supports 42 for eight hampers 43 for temporarily storing the selected items, holders 44 for orders disposed adjacent controls indicated generally at 45 for the platform and a protective railing 35 or fence sections 46 having in one a gate 47. The control system for each platform 31 is such that they can only be lowered from their respective overhead areas through outlets 48 in the overhead structures which are aligned with starting positions on the main floor in their respective aisles 11 adjacent their respective conveyors 16. The overhead support 19 in the areas of the aisles 11, other than the outlets 48, is covered with a protective screen as a safeguard against accidents occurring through the accidental dropping of items in these overhead areas.

Figure 3:
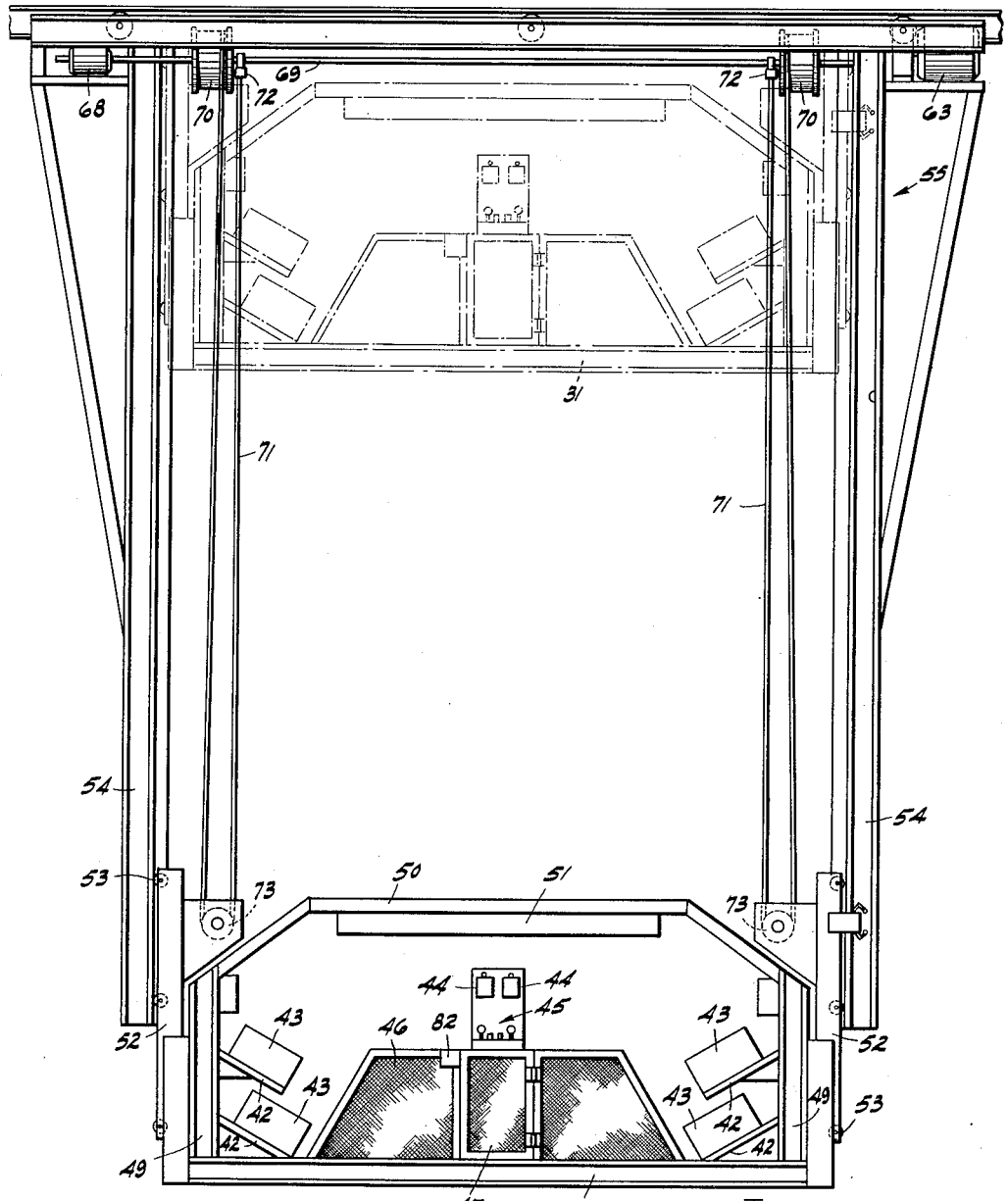
FIG. 3 is a side elevational view of one of the platforms and its drive means.
Figures 5, 6:
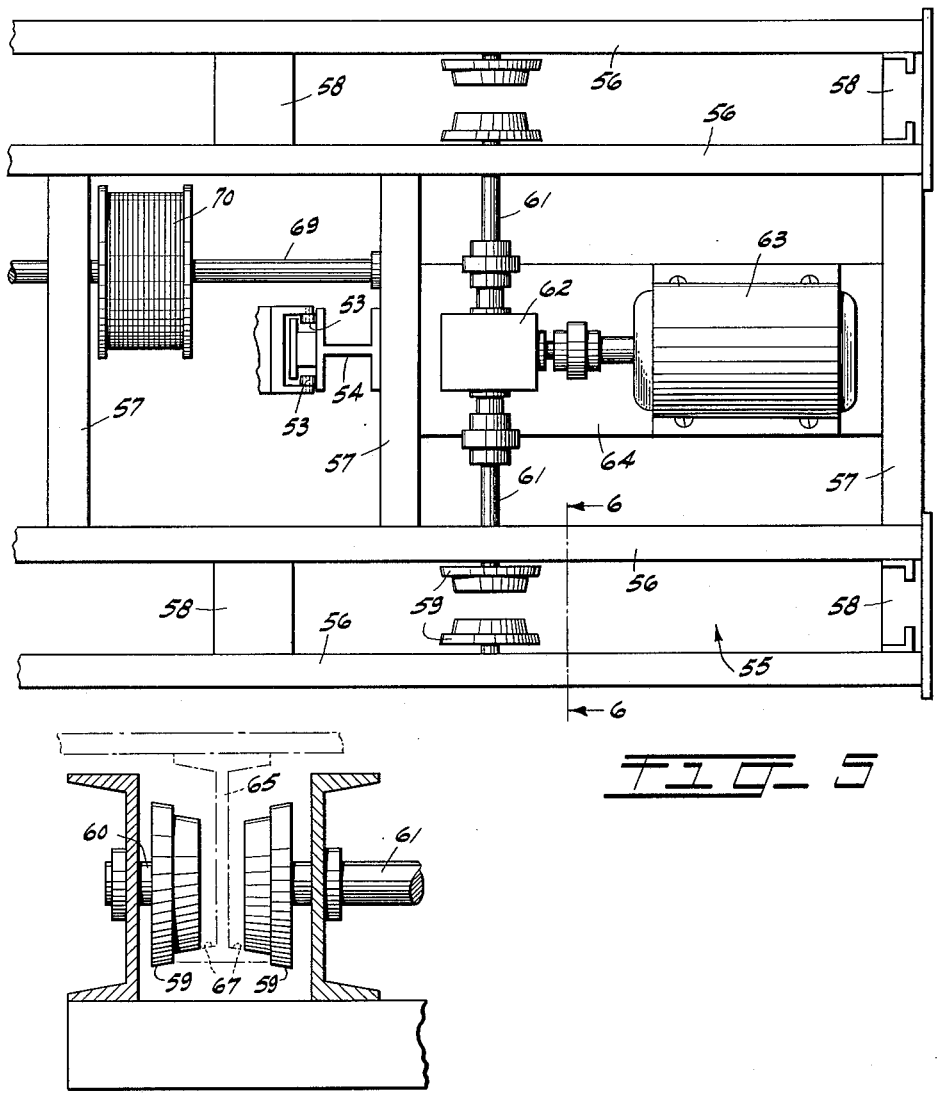
FIG. 5 is a top plane view of a portion of the drive means for one of the platforms.
FIG. 6 is an enlarged vertical sectional view taken along the line 6—6 of FIG. 5.

Each platform 31 has vertical end members 49 supporting an overhead structure 50 protecting the selector and carrying suitable lighting means 51. Auxiliary members 52 are fixed to the vertical end members 49 and carry rollers 53 to ride in channel-like legs 54 of a carriage indicated generally at 55 (FIGS. 3 and 5). The carriage 55 is a framelike structure with outer pairs of channel members 56 fixed to lateral members 57 and spacers 58. Wheels 59 rotatably mounted on spindles 60 are mounted at spaced positions along the inner faces of the outermost channel members 56. Similar wheels 59 are mounted similarly along the inner faces of the innermost channel members 56 and two of these wheels are mounted on the outer ends of shafts 61 extending from a gear box 62. The gear box 62 and a motor 63 for driving it are mounted on a support 64 positioned between two of the lateral members 57. The carriage 55 with its trolley motor 63 and drive are in each instance mounted on a pair of I-beam tracks 65 supported by upper structures 66 and positioned for the various pairs of wheels 59 to ride on the lower portions 67 thereof. One wheel 59 of each group of pairs of wheels is driven by the trolley motor 63 and as this motor is reversible the carriage and the platform may be moved longitudinally of the shelf units.

The carriage 55, in each instance, supports a reversible hoist motor 68, its shaft 69, winches 70 mounted at spaced positions on the shaft and cables 71. Clamps 72 fixed to the carriage 55 hold like ends of their cables 71. The other ends extend first about pulleys 73 carried by the vertical members 49 of the platform and then about their winches to which they are secured. By driving the hoist motor 68 in either direction the platform may be raised and lowered.

Figure 7:
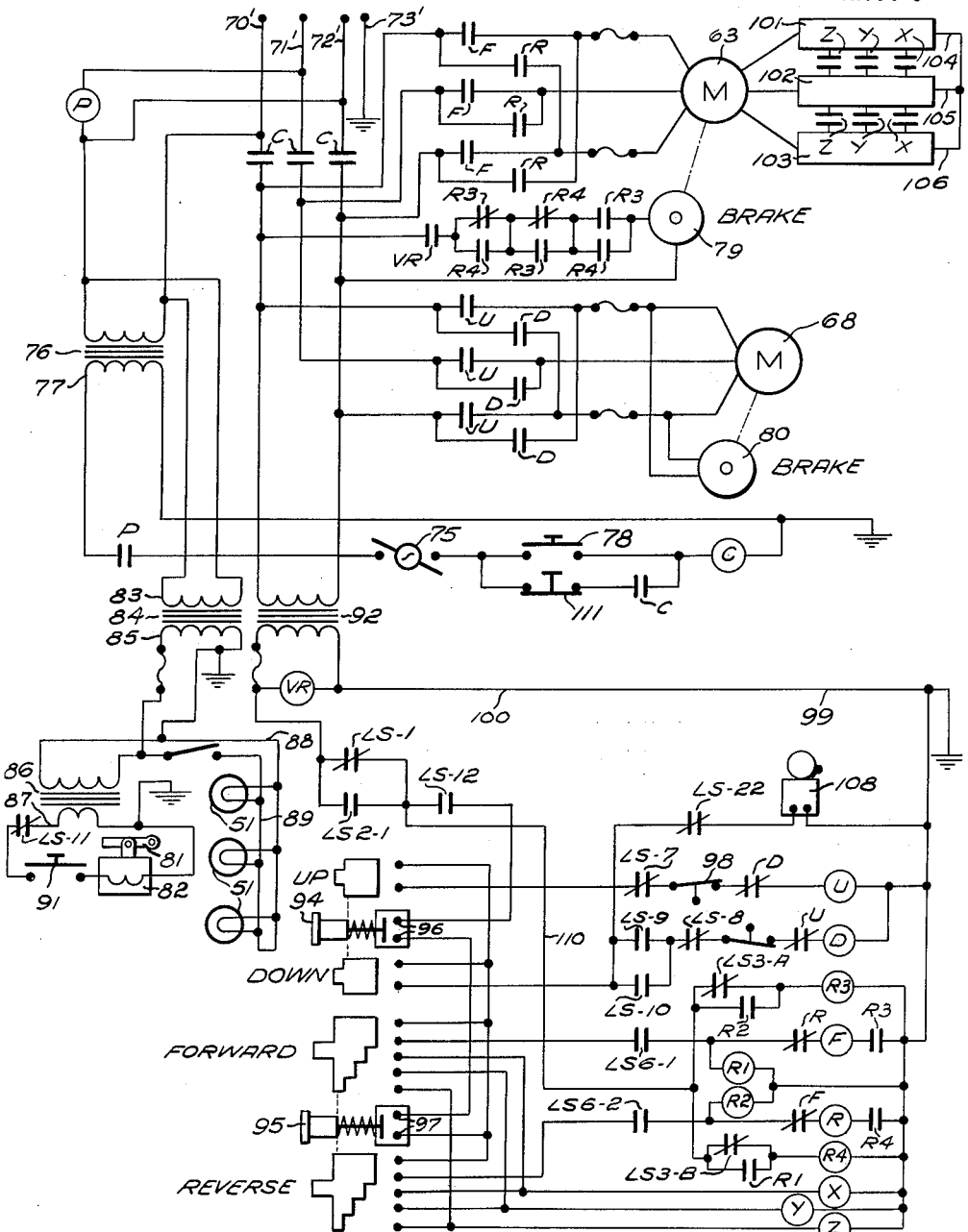
FIG. 7 is a wiring diagram of the control means for the platform.

A control system, as shown in FIG. 7, is provided for each platform. This control system includes main supply lines 70', 71', and 72', and a ground line 73'. These lines may be made effective or connected to their sources of energy through suitable switches not shown. Let it be assumed that one of the platforms is at the starting position shown in solid lines in FIG. 2. At this time, the selector or operator may enter the platform through the gate 47, closing the gate after him. The first act by the selector is to close a key switch 75. Preceding circuits have been conditioned by closing of lines 70', 71', 72', and 73' to their supplies to operate relay P to close its contacts P. A transformer 76 is energized supplying electrical energy from its secondary winding 77 to a circuit which is conditioned for closing by closing of contacts P of relay P. At this time, start switch 78 may be closed momentarily completing a circuit through relay C to close its contacts C in the circuit with the key switch 75 and in lines 70', 71', and 72'. When key switch 75 is closed start switch 78 may be released. This action conditions circuits for the carriage motor 63 and for the elevator motors 68 as well as their respective brakes 79 and 80. The brakes 79 and 80 are normally mechanically closed to stop their motor shafts and are electrically opened when their motors are energized to free the motor shafts for rotation.

Door 47 of the platform 31 has a latch 81 holding the doors closed until released by energization of the solenoid 82. A primary winding 83 of a transformer 84 is energized through a circuit completed to lines 71 and 72 to energize the secondary winding 85 to supply electrical energy through a transformer 86 to circuits 87 for the solenoids 82. The secondary winding 85 also supplies electrical energy to lines 88 and 89 for suitable lighting means 51 traveling with the platform to illuminate not only the platform, but the surrounding areas of the shelf units through which the platform is traveling or located. The circuits 87 are under the control of their respective switches 91 and also limit switch LS–11 which is closed only when the platform is in the starting position and will be opened when the platform moves upwardly from its starting position. Another transformer 92 energized from lines 70 and 72 energizes relay VR. When relay VR is energized, its normally open contacts VR in the control circuit for the brake 79 are closed.

The drive means for the platform has a safety feature which requires both hands of the selector to drive the platform vertically and/or horizontally. This safety feature is centered about spring-return normally open controllers 94 and 95. The controllers 94 and 95, when pressed, close their respective contacts 96 and 97 which are required to be closed regardless of which movement is to be imparted to the platform. When the paltform is in the starting position, shown in FIG. 2, it is not possible to impart forward or reverse movements to the platform, these motions being rendered effective after the platform moves through the opening 48 and enters the area above the overhead support 19 and the second floor 32. Therefore, the selector operates both controllers 94 and 95 closing the contacts 96 and 97. In this instance the controller 94 is closed by operating the up switch. These actions complete a circuit from the left side of the secondary winding of transformer 92, through closed limit switch LS–1, through closed limit switches LS–12 when the gate 47 is closed, through contacts 96, contacts 97, closed contacts of the up switch, through normally closed limit switch LS–7, normally closed switch 98, normally closed contacts D, relay U, and through lines 99 and 100 to the other side of the primary winding of the transformer 92. Energization of relay U closes its contacts U to energize motor 68 to drive the platform upwardly, the upward driving continuing until the selector has reached a desired position above the overhead support 19.

The selector may operate the forward switch while both controllers 94 and 95 are closed, it being understood that the operation of either up or down switch will operate controller 94 closed and the operation of either forward or reverse switch will operate controller 95 closed. At this time, attention is directed to the forward and reverse switches and their respective five contacts. The top two contacts of each group of five contacts will complete circuits through their respective relays F and R to drive their respective motor 63 either forwardly or reversely at what may be defined as slow speed, in that the circuits completed will include full resistances of units 101, 102, and 103 through lines 104, 105, and 106. The next three contacts in each group, namely, the third, fourth, and fifth contacts reading downwardly in each group for the forward and reverse switches, when closed by their respective switches, complete circuits through relays X, Y, and Z, respectively, to close their contacts X, Y, and Z either singly or in groups to vary the resistances of the units 101, 102, and 103 for motor 63 to result in respectively increasing the speed of the motor.

As an illustration, with controller 94 closed and controller 95 operated into closed positions by the forward switch moved to close its top two contacts, a circuit will be completed from the left side of the secondary winding of the transformer 92 through closed limit switches LS–1, LS–12, and closed contacts 96 and 97, closed top two contacts of the forward switch through LS–6–1, which has been closed when the platform moves through the opening 37, FIG. 2, through closed contacts R, relay F, through contacts R–3, closed by energization of relay R–3, and through lines 99 and 100 to the other side of the transformer. This will result in driving the motor 63 at a selected slow speed. If the operator wishes to increase the speed, additional pressure on the forward switch will close the third or the third and fourth, or the third, fourth, and fifth contacts to selectively energize relay X, or X, and Y, or X, Y, and Z to vary the resistance for the motor 63. A similar action may take place for reversing the motor 63 by closing the controller 94 and causing controller to be closed by closing 95, the reverse switch to energize the motor 63 in reverse, to move the carriage to the left at any of the four selective speeds.

Figure 4:
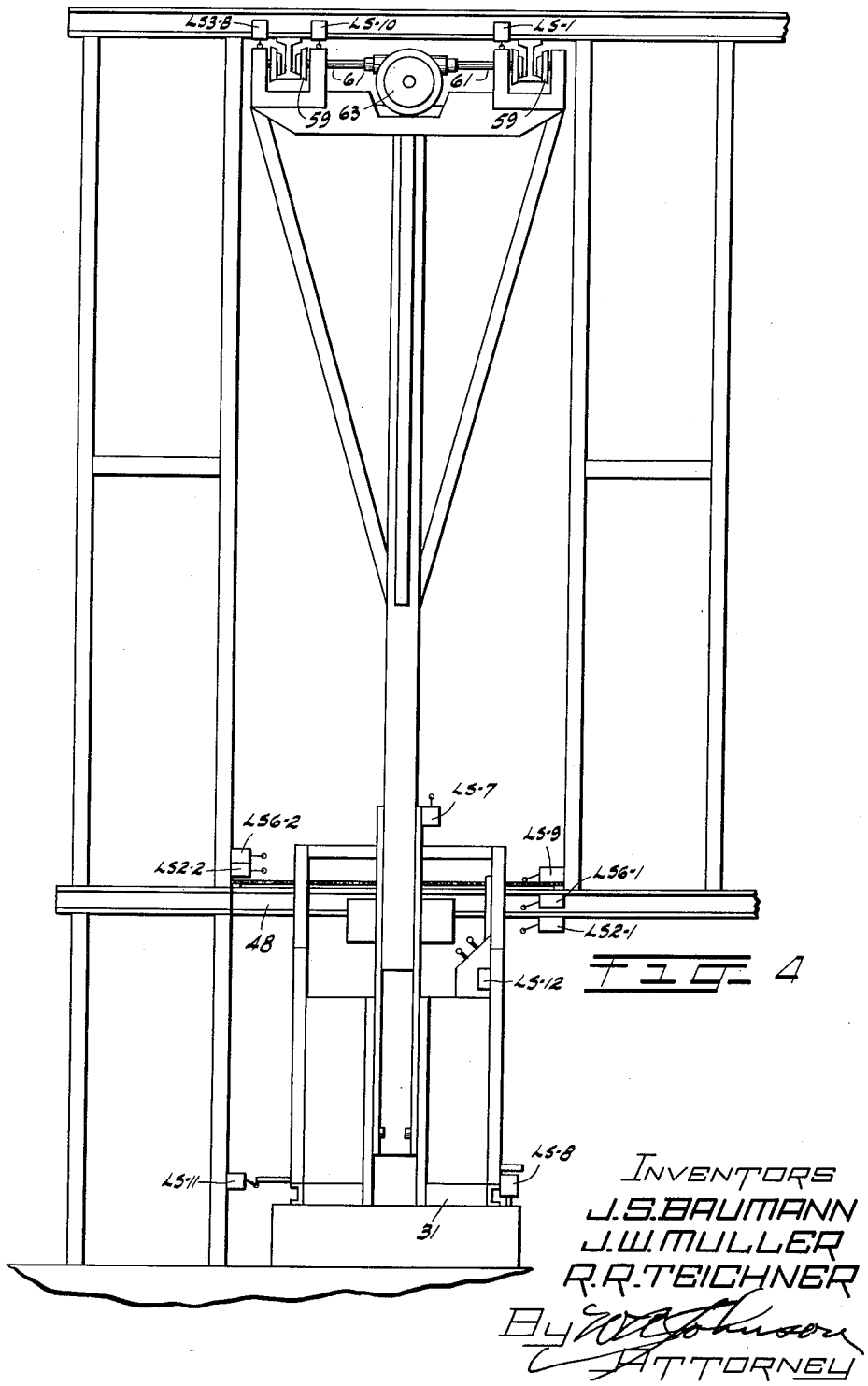
FIG. 4 is an end elevational view of a portion of the system illustrating one of the platforms and its associated drive.

There are numerous limit switches serving as assisting means for the selector and as safety factors for the system. A number of these limit switches are illustrated schematically in FIG. 4 and are mounted at any desired positions as somewhat illustrated in this figure. Starting at the bottom of FIG. 2, LS–11 is closed only when the platform is in its starting position to render the latch 81 for the gate 36 operable, and is opened as soon as the platform leaves its starting position. Limit switch LS–12 is on the door or gate of the platform and safeguards against accidental or intentional attempts to open the gate after the platform leaves the starting position.

Limit switch LS–2–2 is in a circuit with a signaling means such as a bell 108 to signal the lowering of the platform, from its upper area through the opening 48 toward its starting position. Limit switch LS–6–2 is open when the platform is in its starting position to prevent reverse drive of the motor 63 and the limit switch LS–6–1 is normally open under the same conditions and is closed when the platform enters the upper area of the system. Limit switch LS–2–1 is normally open in line 110 leading to relays R–1, R–2, R–3, and R–4, which must be energized to close their respective contacts R–1, R–2, R–3, and R–4 disposed in the forward and reverse circuits and also the circuit for the brake 79. Limit switch LS–9 is open when the platform is in its starting position and is closed when the platform is raised into the upper area. Limit switches LS–7 and LS–8 are shown mounted on the lower member 43 of the elevator unit 40, the switches being normally closed in their respective Up and Down circuits for their relays U and D and adapted to be opened when the platform reaches respectively its extreme up and down positions in the upper area between the second and third shelf units.

Limit switch LS–1 is normally open but is closed when the carriage 42 is at the extreme left, FIG. 2, to align the platform while in the up position with the starting position. Limit switch LS–10 is normally open but is closed by the carriage 42 when in the position shown in FIG. 2 to by-pass limit switch LS–9 and condition the down circuit for operation of relay D. Limit switch LS–3–B is in the reverse circuit for motor 63 to open the circuit to the motor when the carriage reaches the position shown in FIG. 2. A similar limit switch LS–3–A accomplishes the same result for the forward movement or movement to the right in the upper area toward the second and third shelf units. An emergency stop switch 111 may be opened to render the control system inactive.

Operation

With all the shelf units open at their backs as well as their fronts, other people will have the responsibility of loading the shelves of the shelf units at their open backs without disturbing the selectors removing items from the fronts of the shelves to fill the orders. Furthermore, the selectors working in the aisles and selecting items from the first shelf units 12 are not disturbed by the selectors operating the platforms and selecting items from the second and third shelf units of the upper areas.

After the switches (not shown) for lines 70′, 71′, 72′, and 73′ are closed and there is sufficient power in the lines to operate the motors 63 and 68, power relay P is operated closing its contacts P. Now the control system for the platform is under the control of the key switch 75, the start switch 78, and the stop switch 111. After the key switch 75 is closed, a momentary closing of the start switch 78 will render the system active. However, the system is safeguarded against accidents. The platform cannot be moved horizontally while in the lower area. The platform cannot be moved vertically until the selector is on the platform and the gate is closed and latched. The selector must use both hands to operate the spaced controllers 94 and 95 either individually or through their directional switches. When the controller is compressed closed, the selector operates also the up switch to close the controller 94 to drive the motor 68 to move the platform upwardly through the opening 48 and into the upper area. If the selector should remove either hand to open either controller 94 or 95, the circuit to the driving means is open and the platform will come to a stop. This may be termed a "Dead Man Control" and, with the brakes 79 and 80 stopping the drive means, their actions will stop motions of the platform.

The speed of the vertical travel of the platform is 40 ft. per minute while the speed of the horizontal travel may be increased to 400 ft. per minute. The platform, while in the upper area, may travel up or down, in a forward or reverse direction, or in desired combinations of these directions and at varied forward and reverse speeds. However, in filling large orders or orders for numerous items, it has proven most efficient to work horizontally forward at one elevation and in reverse at another elevation. The hampers 43 on each platform are each sufficiently large for items of an order and numerous orders may be filled and the items selectively grouped before the selector returns from the upper area to the starting position. When the platform is located in alignment with the opening 48, as shown in broken lines at upper left of FIG. 2, the bell 108 will give warning of the platform being lowered toward the starting position. When, and only when, the platform reaches the starting position, can the gates be opened. Now the selector places the items for the several orders in separate containers on the adjacent conveyors with their order slips and receives another group of order slips for another trip to the upper area.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A stock storage and selection system for an area having a floor and a work aisle comprising an elongated first unit of stock supporting shelves with vertical dividers disposed upon the floor along one side of the aisle, a conveyor supported by a frame disposed on the floor along the other side of the aisle, an overhead support mounted at a fixed position with an edge thereof disposed adjacent the top of the first shelf unit and extending longitudinally of the first shelf unit and laterally over the aisle and the conveyor, an elongated second unit of stock supporting shelves with vertical dividers disposed on the top of the first unit and extending upwardly therefrom, a third unit of stock supporting shelves with vertical dividers mounted on the ovehead support above the conveyor and spaced from the second unit, a stock selector's platform positioned normally adjacent the floor in the aisle, drivable elevating means adapted to support the platform, actuable controls mounted on and movable with the platform, and drive means actuable in response to certain of the controls to cause the elevating means to move the platform vertically from the normal position.

2. A stock storage and selection system according to claim 1 in which a track is mounted between and adjacent upper ends of the second and third shelf units, a carriage supported for longitudinal movement on the track, and means connecting the elevating means to the carriage so that the carriage will support the elevating means and the platform for movement horizontally between the second and third shelf units.

3. A stock storage and selection system according to claim 1 in which a guard means mounted on the platform surrounds an area above the platform with the exception of an entrance space, a gate movable relative to the guard means to close the entrance space, and a latch normally moved into closed position to secure the gate against opening.

4. A stock storage and selection system according to claim 3 in which means is operable when the platform is in the normal position to open the latch to free the gate to open, and means responsive to movement of the platform above the normal position to render the latch operating means unoperable.

5. A stock storage and selection system according to claim 2 in which the elevating means includes interengaging pairs of upper and lower telescoping members, the upper members being secured adjacent their tops to the carriage and the lower members being secured adjacent their bottoms to the platform, a reversible drive motor, and means driven by the motor in reverse directions to selectively raise and lower the lower members and the platform.

6. A stock storage and selection system according to claim 5 in which the controls of the platform require both hands of a selector for operation into closed positions, forward and reverse circuits for the motor conditioned for closing by certain of the controls, and forward and reverse switches operable by certain of the controls to close the forward and reverse circuits to cause raising and lowering of the platform.

7. A stock storage and selection system according to claim 6 in which separate force applying means normally urge their controls into normal positions so that any control when released will be moved into normal position to open either circuit to the motor.

8. A stock storage and selection system according to claim 2 in which separate motor drives are energizable in reverse directions to respectively drive the carriage and elevating means to move the platform to predetermined positions between the second and third shelf units.

9. A stock storage and selection system according to claim 8 in which circuits are provided for the motor drives, and switches actuable to close the circuits to selectively cause vertical, horizontal and diagonal movements of the platform.

10. A stock storage and selection system according to claim 9 in which a normally closed switch in a circuit for the motor drive for the elevating means is actuable into open position when the platform reaches a point adjacent the overhead support to de-energize said motor drive.

11. A stock storage and selection system according to claim 9 in which a normally closed switch in a circuit for the motor drive for the elevating means is actuable into open position when the platform reaches a given distance from the carriage to de-energize said motor drive.

12. A stock storage and selection system according to claim 9 in which a normally closed switch disposed in each circuit for the motor drive for the carriage is actuable into open position when the platform reaches predetermined locations adjacent their respective vertical ends of the second and third shelf units.

13. A stock storage and selection system according to claim 12 in which cushioning units are mounted adjacent ends of movements of the carriage to be engaged by the carriage.

References Cited in the file of this patent
UNITED STATES PATENTS

| | | |
|---|---|---|
| 1,522,600 | Strickland | Jan. 13, 1925 |
| 1,839,617 | Tiffany | Jan. 5, 1932 |
| 2,765,928 | Riemenschneider | Oct. 9, 1956 |
| 2,799,406 | Alimanestiano | July 16, 1957 |
| 2,815,871 | Ferguson | Dec. 10, 1957 |
| 2,818,186 | Sinclair | Dec. 31, 1957 |
| 2,885,115 | Stiller | May 5, 1959 |